(12) United States Patent
Peled et al.

(10) Patent No.: US 6,601,338 B1
(45) Date of Patent: Aug. 5, 2003

(54) PLASTIC FILM FOR USE IN AGRICULTURE

(75) Inventors: Uri Peled, Givat Eden, Hanarkis Street 29/6, 30900 Zichron Yaakov (IL); Karl Heinz Bartnig, Ruethen (DE)

(73) Assignee: Uri Peled, Zichron Yaakov (IL)

( * ) Notice: Subject to any disclaimer, the term of this patent is extended or adjusted under 35 U.S.C. 154(b) by 0 days.

(21) Appl. No.: 09/530,871

(22) PCT Filed: Nov. 5, 1998

(86) PCT No.: PCT/IL98/00534

§ 371 (c)(1),
(2), (4) Date: Jul. 21, 2000

(87) PCT Pub. No.: WO99/23872

PCT Pub. Date: May 20, 1999

(30) Foreign Application Priority Data

Nov. 7, 1997 (IL) ................................................. 122138

(51) Int. Cl.⁷ ................................................. A01G 7/00
(52) U.S. Cl. ..................... 47/9; 47/DIG. 6; 47/DIG. 10
(58) Field of Search .................. 47/9, DIG. 6, DIG. 10, 47/58.1, 1.01 R; 111/102; 428/411.1

(56) References Cited

U.S. PATENT DOCUMENTS

| | | | | |
|---|---|---|---|---|
| 3,839,139 A | * | 10/1974 | Ito et al. ....................... 428/141 |
| 3,857,804 A | * | 12/1974 | Glatti et al. ................. 252/582 |
| 4,235,043 A | * | 11/1980 | Harasawa et al. ............. 47/1.4 |
| 4,826,729 A | * | 5/1989 | Kitamura et al. ......... 428/411.1 |
| 4,920,692 A | * | 5/1990 | Kitamura et al. ............... 47/32 |
| 5,138,792 A | * | 8/1992 | Allingham ........................ 47/9 |
| 5,256,473 A | * | 10/1993 | Kotani et al. .................. 241/21 |
| 5,336,457 A | * | 8/1994 | Wu et al. ............ 260/DIG. 43 |
| 5,644,998 A | * | 7/1997 | Krolick ....................... 111/102 |
| 5,729,929 A | * | 3/1998 | Burke .............................. 47/9 |
| 5,761,847 A | * | 6/1998 | Ito et al. ...................... 47/65.8 |
| 5,771,630 A | * | 6/1998 | Harasawa et al. ............. 47/17 |
| 6,339,898 B1 | * | 1/2002 | Toye ............................... 47/9 |

FOREIGN PATENT DOCUMENTS

EP 0171890 * 6/1985 ............ A01G/9/14

OTHER PUBLICATIONS

Center for Plasticulture, Colored Mulch Trial, The Pennsylvania State University, Orzolek et al, 3 pages, 1995 [retrieved online on Nov. 14, 2002 from http://plasticulture.cas.psu.edu/Cmulch.htm].*
Chicago Tribune, New Look at Latchkey Kids, by Jim Spencer, Jul. 24, 1987, 2 pages..*

\* cited by examiner

Primary Examiner—Peter M. Poon
Assistant Examiner—Andrea M. Valenti
(74) Attorney, Agent, or Firm—Much Shelist Freed

(57) ABSTRACT

The invention provides a polymeric, multilayer, photoselective film for use in agriculture, comprising at least two layers, an upper layer facing the sky an a lower layer facing the ground, each of the layers being of a different color, and each being light-transmissive, wherein the upper layer is of a color which repels insects, and the lower layer is of a color whereby the solar radiation transmitted by the film and reaching the ground is of such a spectral composition as will largely deprive weeds of essential photosynthetically active radiation, while having a spectral component that will be absorbed by, and will heat, the ground.

8 Claims, No Drawings

PLASTIC FILM FOR USE IN AGRICULTURE

TECHNICAL FIELD

The present invention relates to a mulch film for use in agriculture.

BACKGROUND ART

The use of mulch films, that is, plastic films spread along the ground and provided with holes for the sowing of seeds or planting of seedlings, is well-established in agriculture. Their purpose is to promote plant growth by ensuring favorable growth conditions, such as enhanced soil temperatures, as well as reliable weed control without need for herbicides. Such influencing of the plant environment is possible by manipulation of absorptive, reflective and transmissible properties of the mulch film.

Such a film is known from European Patent Publication No. 0 398 243, some of the teachings of which are incorporated herein by reference.

While, due to photoselective transmission, the green film according to said publication provides a useful answer to the above-mentioned problems, the subject matter thereof does not address the important problem of effective protection against insects that constitute vectors of various plant diseases and require the application of agrochemicals and/or insect netting. Agrochemicals load the environment and insect nets reduce the crop yield, due to their reduction of the transmission of light

DISCLOSURE OF THE INVENTION

It is thus one of the objects of the present invention to provide a mulch film that not only heats the soil it covers and substantially reduces weed growth, but also acts as a repellent with respect to insects, many of which act as disease vectors, this property being based on photoselective reflection of light.

According to the invention, the above object is achieved by providing a polymeric, multilayer, photoselective mulch film for use in agriculture, comprising at least two layers, an upper layer facing the sky and a lower layer facing the ground, both layers being light-transmissive, wherein said upper layer is of a substantially yellow color and the lower layer is of a substantially blue color, whereby the solar radiation transmitted by said film and reaching the ground is substantially in the green and the far-red range of the solar spectrum, with the green component largely depriving weeds of essential photosynthetically active radiation and the far-red component being absorbed by, and heating, the soil, and whereby the yellow color of the upper layer serves to repel insects liable to act as vectors of plant diseases.

The invention further provides a method of crop cultivation, comprising the steps of providing a multilayer, light-transmissive mulch film, one layer of which is yellow and the other layer of which is blue; spreading said mulch film along the ground with the yellow layer facing the sky and the blue layer facing the ground, and providing suitably spaced holes in said film, or using pre-prepared holes in said film, to sow seeds or plant seedlings.

DETAILED DESCRIPTION

The film proposed by the invention is a UV-stabilized, two-layer, light-transmissive film, preferably produced by co-extrusion from any of the commercially available polymers (polyethylene and its copolymers, PVC, etc.), with one layer of a substantially yellow color and the other layer of a substantially blue color. Together, these two layers transmit about 15–30 percent of the solar energy in the green range, with a maximum at about $0.56\mu$. They also transmit in the far-red region between $0.75–1.1\mu$. The film thus filters out a large part of the photosynthetically active radiation (PAR), thus greatly reducing weed growth which is stunted by the absence of PAR, while passing the far-red, thus warming the soil.

The characteristic property of the mulch film according to the invention resides, however, in the fact that the yellow surface of the upper film layer is known to repel insects that are likely to act as vectors of various viral plant diseases.

The method of using the mulch film according to the invention is as follows:

The film is spread along the ground with the yellow surface facing the sky, and suitably spaced holes are prepared (or pre-prepared holes are used) to sow seeds or plant seedlings.

The mulch film according to the invention originates in a co-extruded tube or hose, which is slit open lengthwise to produce the film, It is, however, quite possible to forego the slitting stage, fill such a tube with soil, close it at both ends and provide the above-mentioned sowing and planting holes. The tube region with the holes would still serve as mulch, and such 'mulch tubes' could be used in regions with poor soil.

While the above-discussed green color of the light transmitted by the two layers gives excellent results, favorable results are also attainable with violet, orange and brown colors of transmitted light.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A polymeric, multilayer, photoselective mulch film for use in agriculture, Comprising at least two layers, an upper layer facing the sky and a lower layer facing the ground, each of said layers being of a different color, and each being light-transmissive;

wherein said upper layer is of a color which repels insects, and said lower layer is of a color whereby the solar radiation transmitted by said film and reaching the ground is of such a spectral composition as will largely deprive weeds of essential photosynthetically active radiation, while having a spectral component that will be absorbed by, and will heat, the ground.

2. A polymeric, multilayer, photoselective mulch film for use in agriculture, comprising at least two layers, an upper layer facing the sky and a lower layer facing the ground, both layers being light-transmissive;

wherein said upper layer is of a yellow color and said lower layer is of a blue color;

whereby the solar radiation transmitted by said film and reaching the ground is in the green and the far-red range of the solar spectrum, with the green component largely depriving weeds of essential photosynthetically active radiation and the far-red component being absorbed by, and heating, the soil, and whereby the yellow color of said upper layer serves to repel insects liable to act as vectors of plant diseases.

3. The mulch film as claimed in claim 1, wherein said two layers are co-extruded.

4. The mulch film as claimed in claim 2, wherein said green component peaks at a wavelength of $0.56\mu$, and the far-red component covers the range of $0.75–1.1\mu$.

5. The mulch film as claimed in claim 1, wherein the colors of said two layers produce a transmitted light of a color selected from the group including violet, orange and brown.

6. The mulch film as claimed in claim 1 or 2, whenever used in the form of a tube.

7. A method of crop cultivation, comprising the steps of:

providing a multilayer, light-transmissive mulch film, one layer of which is of a color which repels insects, and the other layer of which is of a color whereby the solar radiation transmitted by said film and reaching the ground is of such a spectral composition as will largely deprive weeds of essential photosynthetically active radiation, while having a spectral component that will be absorbed by, and will heat, the ground;

spreading said mulch film along the ground with the insect-repelling layer facing the sky and said other layer facing the ground, and providing suitably spaced holes in said film, or using pre-prepared holes in said film, to sow seeds or plant seedlings.

8. A method of crop cultivation, comprising the steps of:

providing a multilayer, light-transmissive mulch film, one layer of which is yellow, and the other layer of which is blue;

spreading said mulch film along the ground with the yellow layer facing the sky and the blue layer facing the ground, and providing suitably spaced holes in said film, or using pre-prepared holes in said film, to sow seeds or plant seedlings.

* * * * *